Patented Sept. 26, 1944

2,359,212

UNITED STATES PATENT OFFICE 2,359,212

PROCESS FOR DEPOLYMERIZING POLYSTYRENE

Joseph C. Frank and James L. Amos, Midland, and Albert F. Straubel, Auburn, Mich., assignors to The Dow Chemical Company, Midland, Mich., a corporation of Michigan No Drawing. Application September 17, 1941, Serial No. 411,150

2 Claims. (Cl. 260—669)

This invention relates to a method for the depolymerization of polystyrene to produce lower styrene polymers and monomeric styrene.

In the commercial preparation and use of solid resinous polystyrene, e. g., for the manufacture of molded articles, a problem of economic importance is the utilization of trimmings, off-grade batches, and other types of scrap material. One method that has been suggested for the profitable utilization of such material is its depolymerization to the lower polymeric forms by heating. Such depolymerization of polystyrene has also been shown to be of importance as one step in a method for the recovery of styrene from drip oil, cracked petroleum fractions, and the like, where the styrene is present in low concentrations and usually associated with other compounds boiling over the same range as styrene. Thus, a styrene-containing fraction obtained from such sources may be treated to polymerize the styrene to a high molecular weight product which may then be separated from the fraction and depolymerized by direct heating to styrene and lower polymers which may then be purified or utilized in known manner.

The pyrolysis of polystyrene has not heretofore been commercially feasible due principally to the extremely low heat conductivity of polystyrene and the consequent difficulty of heating the main body of the material without overheating the outer layers. It has been shown that when the depolymerization is carried out by heating the polystyrene under vacuum to remove the styrene and lower polymers rapidly from the hot zone, a longer heating period is required and little, if any, decrease in the amount of by-products formed is obtained. When the pyrolysis is carried out by such previously known methods there are formed, in addition to styrene and its lower polymeric forms, appreciable quantities of undesirable hydrocarbons, e. g., 1,3-diphenylpropane, 1,3,5-triphenylpentane, 1,3,5-triphenylbenzene and toluene, together with ten to twenty per cent of tarry residue.

We have now found that polystyrene may be depolymerized rapidly, and with the production of only minor amounts of by-products, by subjecting it to the action of superheated steam. The depolymerization is usually carried out by placing the polystyrene in a vessel fitted with a condenser and receiver and intimately contacting the superheated steam with it. Solid polystyrene may be broken up and fed continuously into the depolymerization vessel and be subjected to the action of steam in the solid or semi-solid state. Liquid polymeric styrene may be run into the depolymerization vessel and superheated steam blown through the liquid, or it may be treated with steam counter-currently in a tower. The monomeric styrene vapors together, usually, with considerable amounts of the lower polymeric forms of styrene and the steam may be condensed and collected in the receiver, or they may be fractionally condensed to separate the lower polymers from the styrene.

The depolymerization is usually carried out at atmospheric pressure, although higher or lower pressures may be used if desired. Steam at a temperature between 250° and 600° C., preferably between 300° and 450° C., is used in the process. Although the amount of steam used relative to the amount of polystyrene depends upon several factors, e. g., the rate of flow of the steam, the degree of contact between the polystyrene and the steam and the particular temperature used, it is usually from five to twenty-five times the weight of the polystyrene, and may be more or less than this amount.

The oily layer in the receiver may be separated from the aqueous layer and treated in any suitable manner, e. g., by steam distilling, to separate the monomeric styrene. Lower polymeric forms of styrene may be fed back into the process to produce additional monomeric styrene, if desired, or the oil remaining after steam distilling the monomeric styrene may be fractionally distilled to isolate fractions rich in a single lower polymer of styrene, e. g., the dimer, the trimer, or the tetramer, which may be collected as final products.

The following examples will serve to illustrate the principles of the invention, but are not to be construed as limiting its scope:

Example 1

4390 grams of polystyrene was placed in an iron reactor fitted with a condenser and receiver. 60,780 grams of steam at a temperature of 350° C. and at atmospheric pressure was passed through the reactor. 4321 grams of oily material were separated from the water in the receiver. This was a recovery of 98.4 per cent based on the polystyrene used. The oily layer from the receiver was fractionally distilled to recover monomeric styrene. There was thus obtained 2250 grams of the latter compound of 98.4 per cent purity or a 51.4 per cent yield on the basis of the polystyrene started with. The residue from the fractional distillation was fed back into a subsequent depolymerization experiment.

*Example 2*

5495 grams of polystyrene was treated with 50,370 grams of steam at 340–360° C. and at atmospheric pressure as in Example 1. The oily layer which collected in the receiver weighed 5195 grams which was a recovery of 94.5 per cent on the basis of the polystyrene used. The oily layer was fractionally distilled and found to contain 52.6 per cent of monomeric styrene, 22.2 per cent of dimeric styrene, 16.8 per cent of trimeric styrene, and 3.4 per cent of tetrameric styrene.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. The method which comprises heating polystyrene to a depolymerizing temperature between 250° and 600° C. by passing superheated steam of at least as high a temperature into contact therewith and condensing the styrene which is evolved together with the steam.

2. In a method of depolymerizing polystyrene, the steps of heating the latter to a depolymerizing temperature between 300° and 450° C. by passing steam which has been superheated to a temperature higher than the depolymerizing temperature into intimate contact with the polystyrene, condensing the evolved depolymerization products and fractionally distilling the latter to recover therefrom a fraction of styrene and another fraction of dimeric styrene.

JOSEPH C. FRANK.
JAMES L. AMOS.
ALBERT F. STRAUBEL.